July 2, 1968 B. GOLDBERG 3,391,344

DIGITAL SIGNAL SYNCHRONOUS DETECTOR
WITH NOISE BLANKING MEANS

Filed April 7, 1967 2 Sheets-Sheet 1

INVENTOR,
BERNARD GOLDBERG.
BY Harry M. Saragovitz
Edward J. Kelly, Herbert Berl
& Julian C. Keppler
ATTORNEYS INVENTOR,
BERNARD GOLDBERG.
BY Harry M. Saragovitz,
Edward J. Kelly, Herbert Berl
& Julian C. Keppler
ATTORNEYS United States Patent Office 3,391,344

Patented July 2, 1968

3,391,344

DIGITAL SIGNAL SYNCHRONOUS DETECTOR WITH NOISE BLANKING MEANS

Bernard Goldberg, Wanamassa, N.J., assignor to the United States of America as represented by the Secretary of the Army Filed Apr. 7, 1967, Ser. No. 630,492
4 Claims. (Cl. 329—50)

ABSTRACT OF THE DISCLOSURE

An improvement in a signal processing system in which incoming information representing binary characters and of a form employing predetermined generalized functions, such as pseudo-random or sinusoidal functions, is correlated with locally generated signal functions of similar form and offset by some predetermined frequency, integrated, and the integrated levels during each character interval compared in a device whose output is representative of the type of binary character then available, wherein random increases in input signal level are denied access to the integrating means, thus preventing such random fluctuations from contributing to the integrator summation and thereby producing erroneous character indications at the comparison means.

BACKGROUND OF THE INVENTION

Signal processing systems are known in which information is transmitted by digital modulation of a predetermined generalized function, such as a pseudo-random time function or a sinusoidal time function. In such systems, the two digital characters, sometimes referred to as mark and space characters, are represented by different generalized time functions, for example, by different pseudo-random waveforms or by different sinusoidal waveforms, established by means of corresponding separate function generators, such as separate pseudo-random signal function generators or separate sinusoidal function generators. The combined information, consisting of varying combinations of said digital characters, then is transmitted to a receiver which must be able to generate the original waveforms corresponding to the mark and space characters but displaced by a predetermined frequency such as an IF frequency, correlate these waveforms with the transmitted signal information by means of a mark correlator and a space correlator, and, after integrating the correlated information from the mark and space correlators in respective mark and space integrators, compare the voltage levels thus integrated to provide an output indicative or representative of the character then available.

One of the difficulties with such a system is that the presence of random noise bursts of large amplitude and of duration less than or equal to the character interval can cause ambiguity in the comparison process, and, consequently, an erroneous indication of the type of character presently available at the input terminal.

SUMMARY OF THE INVENTION

In the system of the invention, during the period that such high level random noise bursts appear, these noise bursts, as well as the input character information, arriving during this period is blocked from reaching the integrating means; since the large noise bursts cannot be integrated, the comparator inputs deriving from the integrators during the sampling or measure intervals will not be affected by said noise burst.

If the noise bursts, during a binary character, are of total summed duration less than the interval of a binary character, albeit of high level, the integration of the incoming energy will be discontinued only for the burst durations, with the result that the voltage level of the integrated correlated coherent information still will exceed the voltage level of the integrated uncorrelated incoherent information. In other words, during a given sampling or measure interval, the comparator will still provide an output indicative of the particular character being transmitted during that interval. If the duration of the noise burst occupies an entire binary character (baud) interval, for example, the integration process would be discontinued during that entire binary character interval and no voltages would be available to the comparator. Consequently, although there would be no representation of a binary information character during this binary character interval, neither would there be any ambiguity in character representation. In other words, if, for example, a large noise burst should occur during an entire space baud interval, one would lose the decision that a space baud should be the output. This condition of zero output from both integrators can be used to provide an output indication that no decision is to be made for that particular baud interval. This, however, is preferable to having integrated information supplied to the comparator such as to falsely indicate a mark baud.

Although the system, according to the invention, could sometimes result in loss of decision relating to one or more characters of information, usually this is much preferable to the system of the prior art where the noise is allowed to enter the integrators and be supplied to the comparator. In such cases, erroneous information may be supplied during the period in which the random noise bursts occur; as a matter of fact, the information which would then be available under prior art conditions may well be worse than none at all.

DESCRIPTION OF THE PREFERRED EMBODIMENT

Figure 1:
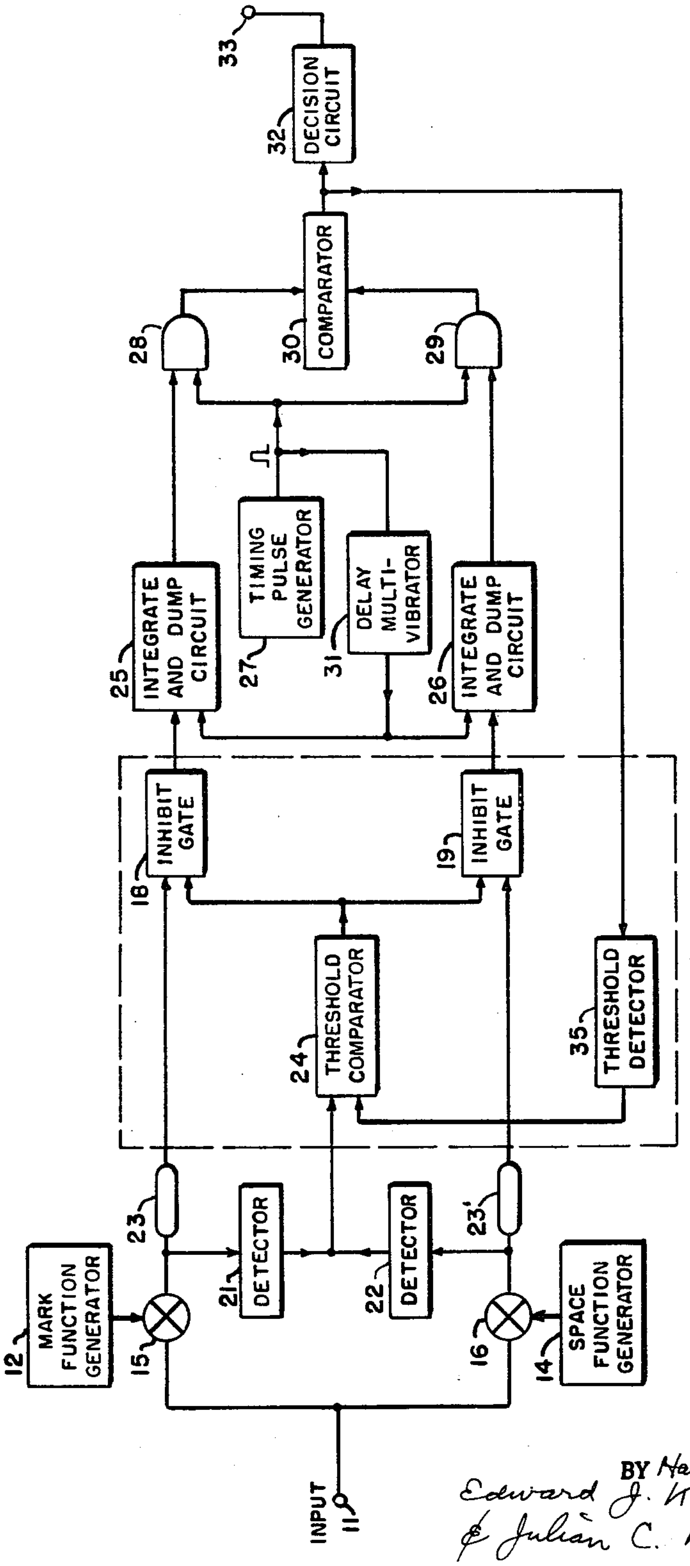
FIG. 1 is a system diagram showing a typical embodiment of the invention.

For explanatory purposes only, the "pseudo-noise" waveform will be cited. A wideband "pseudo-noise" signal having sinusoidal components from a transmitter is received at the input terminal 11. The received signal, indicated by way of example, in FIG. 2*d* of the drawing, is a digitally modulated signal having discrete periods of either "mark" or "space" information content. Typical mark and space intervals are indicated in FG. 2*a* of the drawing. For each mark, the input waveform has a distinctive configuration and the same is true for each space. The various mark and space bauds arriving at input terminals may differ among themselves in amplitude, however, owing to fading and other variations in the transmission link.

In order to extract the information from the modulated transmitted waves, the receiver must regenerate the wave shapes corresponding to a mark and a space and displayed by a predetermined (IF) frequency from the wave shape of the corresponding transmitted wave shape and correlate these translated wave shapes with the transmitted modulated wave. This is achieved by function generators 12 and 14 and respective correlators 15 and 16. In the example shown, the output of the mark function generator 12 is applied to correlator 15, together with the incoming modulated waveform at input terminal 11. Each of the correlators is a linear multiplier and mixer circuit and is well known in the art.

If the information contained in the modulated incoming waveform at some time interval (baud length), for example, the first interval, is a mark, the output of the mark function generator 12 combines coherently with this mark portion of the input waveform and a sinusoidal output (FIG. 2*e*) is derived from mark correlator 15. If, on the other hand, the information contained in the input waveform represents a space, it combines incoherently in the mark correlator 15 with the output of the mark function generator 12 and the output from the mark correlator 15 will be noise-like, as shown in FIG. 2*f*.

During the interval that space information is available at input terminal 11, for example, during the second interval, the output of the space function generator 14 will combine coherently with this space portion of the input waveform and a sinusoidal output (FIG. 2*f*) will be derived from the space correlator 16. In this same interval, if mark information appears at input terminal 11, however, the output of the space function generator 14 combines incoherently with the incoming mark information and a noise-like output is obtained from the space correlator 16, as shown in FIG. 2*e*.

If a mark is represented by a digital ONE and a space is represented by a digital ZERO, the mark function generator and space function generator may be referred to as a ONE function generator and a ZERO function generator, respectively. It is possible, of course, to represent a mark by a ZERO and a space by a digital ONE, in which case the function generators 12 and 14 would be ZERO function and ONE function generators, respectively.

The waveform generated by the function generators 12 and 14 will duplicate the modulated waveforms used at the transmitter for representing mark and space information bauds.

The output (FIG. 2*e*) from correlator 15 is applied to an inhibit gate 18 and also to a detector 21. Similarly, the output (FIG. 2*f*) from space correlator 16 is applied to an inhibit gate 19 and to a detector 22. Detectors 21 and 22 are responsive to the relatively rapid variations in amplitude of the respective correlator output wavetrains. Typical outputs from detectors 21 and 22 are shown in FIGS. 2*g* and 2*h*, respectively. The detector outputs are applied to a threshold comparator 24, the function of which is to supply an inhibit input to inhibit gates 18 and 19 whenever the noise level of the incoming signal at terminal 11 exceeds a predetermined threshold. The output (FIG. 2*e*) from mark correlator 15 passes inhibit gate 18 so long as the level of the incoming signal does not exceed the aforesaid threshold. The mark correlator output (FIG. 2*e*) then is integrated in a combined integrate and dump circuit 25 which may be of the type shown in a U.S. Patent to Wozencraft No. 2,880,316, filed Mar. 21, 1955 and issued Mar. 31, 1959. Briefly, the integrator circuit 25 can comprise a tuned circuit which, in some cases, may also include a Q-multiplier. The tuned circuit in the integrator circuit 25 is shunted by a diode which normally is reverse biased. During periodic receipt of a dumping pulse (FIG. 2*c*), however, the shunting diode becomes conducting and any voltage existing across the tuned resonator circuit is rapidly discharged through the low resistance path of the diode. The dump interval follows closely the corresponding sampling or measure interval and readies the system for the next measure interval. The necessary delay is provided by delay multivibrator 31.

The output (FIG. 2*f*) from space correlator 16 passes through inhibit gate 19, provided the incoming signal at terminal 11 does not exceed the previously mentioned predetermined threshold. The output (FIG. 2*f*) from space correlator 16 is integrated in a combined integrate and dump circuit 26 identical to the integrate and dump circuit 25.

A timing pulse generator 27 serves to provide a series of measure pulses (FIG. 2*b*), each of which occurs near the end of a corresponding baud interval and at a predetermined time interval after the start of each baud interval. This time interval can be established by appropriate timing means synchronized with initiation of successive baud intervals, in a manner well known to those skilled in the art.

The integrator 25 will integrate the output from correlator 15 passed by gate 18 and the integrated output is shown in FIG. 2*i*. During the first mark period, for example, the various sinusoidal pulsations will be integrated by integrator 25, as shown in FIG. 2*i*. The magnitude reached during an integration cycle will depend upon such factors as variations in level of the mark correlator output voltage (FIG. 2*e*) and the signal-to-noise ratio during the integration period. For example, during the first mark period, the amplitude of the fluctuating voltage from correlator 15 is assumed constant and the integrated output during that period will attain some level $V_{m1}$. On the other hand, during the second mark period, for example, during the third interval, the fluctuations in mark correlator output voltage is assumed to be of lesser magnitude; consequently, the integrated output voltage attained will be a value $V_{m2}$ somewhat smaller than that attained during the first mark period. During each of the space periods, for example, during the second interval, the output of mark correlator 15 will be random in character and the amplitude of the integrated waveform from integrator 25 will be of very little value.

The integrator 26 will integrate the output of correlator 16 passed by gate 19. The waveform from integrator 26 is shown in FIG. 2*j*. During the first space period (interval 2), the amplitude of the fluctuating output voltage from correlator 16, for an illustrative purpose, is assumed to decrease during the middle of the integrator cycle. This will result in a slower rise in amplitude of the integrated voltage and the final amplitude level $V_{s1}$ attained will be of lesser magnitude than the final magnitude level $V_{s2}$ attained during the second space period (interval 4) when the sinusoidally varying signal from correlator 16 is assumed to be more or less constant in amplitude. During the mark periods, the output of the space correlator 16 will be random and the amplitude of the integrated waveform coming from integrator circuit 26 will be of very low value.

The measure pulses (FIG. 2*b*) from timing pulse generator 27 serve as one input for each of and gates 28 and 29. When the measure pulses occur, the and gates 28 and 29 are enabled and the voltage level then present at the corresponding integrators 25 and 26 are applied to a voltage amplitude comparator circuit 30. It should be noted that, in order to establish a sense of polarity to differentiate between mark and space signals, a 180° phase shift is introduced, in this case, in the space processing line, for example, within the integrate and dump circuit 26. The integrated voltage existing at integrator circuit 25 during each measure pulse is compared with the integrated voltage existing during the same time interval at integrator circuit 26. A measurement of the integrated voltage must be made once during each baud interval, even though the same type of signal may occur in succession for more than one baud interval. Since a new measurement must be made each baud interval, it is necessary to dump the integrator output during each baud interval. The dumping is achieved by the dump pulses (FIG. 2*c*), preferably at the end of the baud interval. The measurement is usually made as near the end of the baud interval as possible, for obvious reasons.

An output voltage (FIG. 2*k*) is derived from comparator 30 during the sampling or measure period. The magnitude of the comparator output voltage, because of the 180° phase shift in the space (in this example) line, depends upon the relative magnitudes of the two integrated voltages during the measure interval and the polarity of the comparator output voltage depends upon which of the two integrator voltages is the larger. For example, during the measure interval of the first mark period (interval 1), the output level $V_{m1}$ of integrator 25 is much greater than the output level of integrator 26, for reasons already mentioned. During this interval, the positive going pulse is derived from comparator 30, as shown in FIG. 2*k*. During the measure interval of the first space period (interval 2), the measured voltage level of integrator 25 is considerably smaller than the voltage level of integrator 26. Consequently, a negative going pulse is derived during the measure interval of the first space period. This comparator output can be applied to a decision circuit 32 which may be a flip flop which remains in one state until a pulse of opposite polarity from the comparator 30 is applied thereto. For example, an output line from one of the two stages of the flip flop may be connected to output terminal 33. An output pulse (FIG. 2*n*) can be made to appear on this output line only when a positive going pulse is derived at the output of comparator 30.

When a negative going pulse appears at comparator 30, the output stage of the flip flop will have no output pulse and there will be no pulse at the system output terminal 33 until the arrival of the next positive going pulse at comparator 30. Since a positive going pulse from comparator 30 corresponds to a mark and a negative going pulse from comparator 30 is derived for a space, the presence of an output pulse at output terminal 33 will be indicative of the presence of a mark at the input terminal 11. Similarly, the absence of an output pulse at output terminal 33 will denote the presence of a space at input terminal 11.

In the aforesaid example, a mark has been represented digitally by a "ONE" while a space has been represented as a "ZERO." It is possible, of course, to represent a mark as a "ZERO" and a space as a "ONE." In such a case, the polarity of pulses derived from comparator 30 representing marks and spaces would be reversed as would be the polarity of the output of the decision circuit 32.

It should be noted that the mark-space waveform shown in FIG. 2*a* may be a RZ or NRZ waveform. In either case, the term "polarity" is intended to distinguish between the more positive portions of the waveform and the more negative portions thereof.

The comparator output varies somewhat from character to character, as is indicated in FIG. 2*k*. This output normally is slowly varying, owing to ever-present changes in transmission level inherent in any practical data transmission link. These changes are detected by a threshold detector 35, which is a detector having a long time constant, in contrast with detectors 21 and 22 which are designed to respond to rapid variations in signal levels. The output (FIG. 2*l*) from the threshold detector circuit 35 is applied to the threshold comparator 24 which compares the magnitude of the detected outputs (FIGS. 2*g* and 2*h*) from correlators 15 and 16, respectively, with the level of the detected output (FIG. 2*l*) from threshold detector 35.

Figure 2:
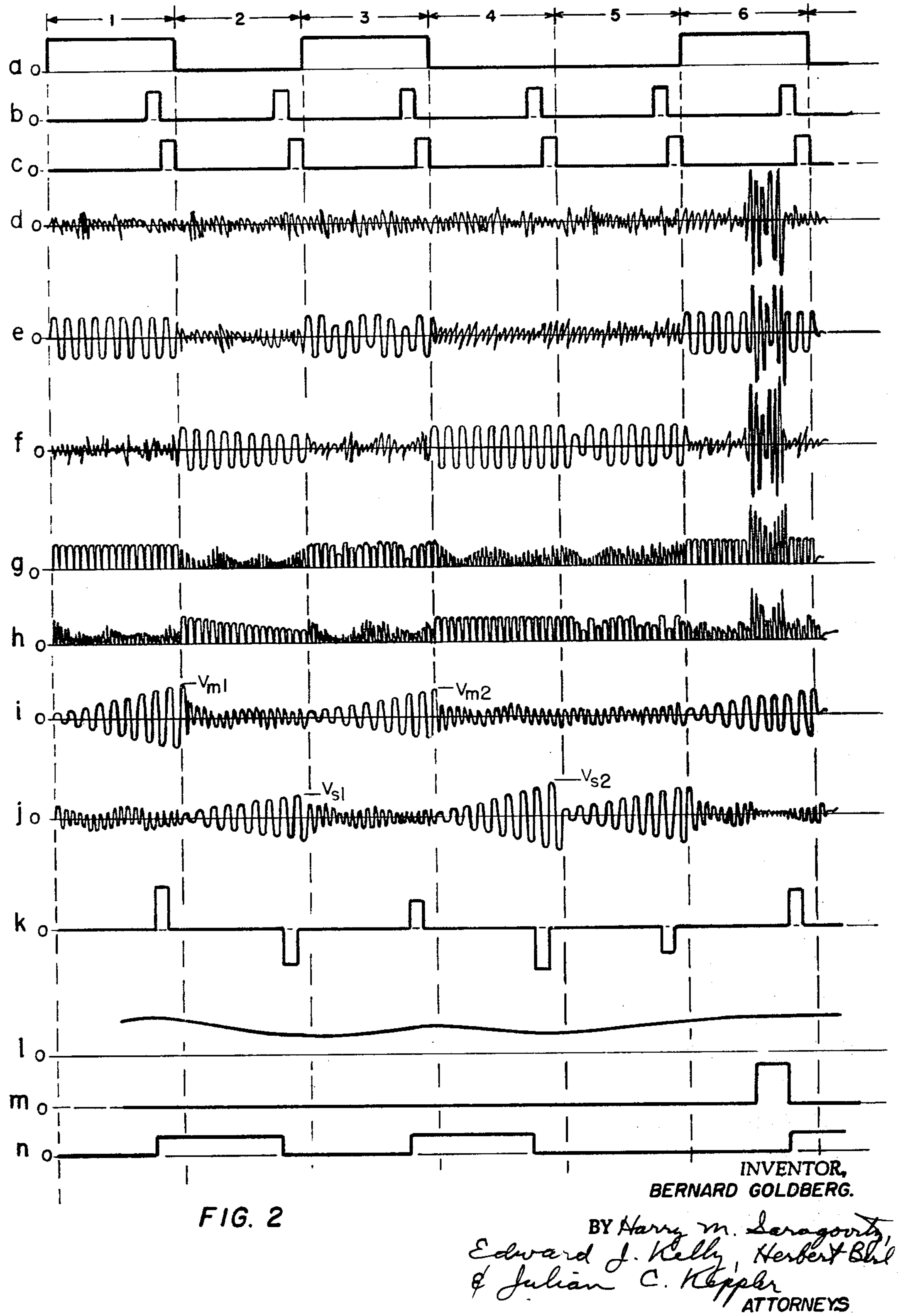
FIG. 2 shows waveforms illustrating the operation of the system of FIG. 1.

Normally, the threshold comparator 24 is biased such that there will be no output (see FIG. 2*m*) therefrom in the absence of extraneous signals or noise. In other words, a difference in input levels, which can be made adjustable and preset, of the order of 2 or 3 db, for example, is required in order to provide an output from threshold comparator 24. When, during interval 6, the input signal at terminal 11 (FIG. 2*d*) contains a burst of noise, this noise burst will be detected by both detectors 21 and 22, as indicated in FIGS. 2*e* and 2*f*. During the interval of the noise burst, therefore, the difference in amplitudes at the two inputs of threshold comparator 24 will be sufficient to produce an output burst from the threshold comparator 24, as indicated in FIG. 2*m*. This output burst will, when applied to each of the inhibit gates 18 and 19, preclude passage therethrough of the correlator output waves (FIGS. 2*e* and 2*f*) and, during the interval of the output burst, the integrators will have no input upon which to operate. Enough delay is inserted in the mark and space lines, that is, between correlator 15 and gate 18 and between correlator 16 and gate 19 in order to assure timely action of the inhibit gates 18 and 19 during the noise burst epoch. Such delay can be provided by conventional delay means 23 and 23′, respectively. In other words, during the interval of the noise burst, the output (FIGS. 2*i* and 2*j*) of the integrator will remain substantially unchanged, as clearly shown in FIG. 2. Since the noise burst does not contribute to either integrator summation, the level at the integrators during the measure period (see pulses in FIG. 2*b*) is not significantly affected. Consequently, there can be no erroneous comparator output indications and the decision circuit 32 will provide a proper character representation at output terminal 33.

For example, if during the third mark interval (interval 6) shown in FIG. 2, the noise burst were permitted to be integrated, as in the prior art, the output of integrator 26, as well as the output of integrator 25, would be substantial, and the comparator 30, when receptive of these integrated waveforms, might produce an output indicating that a space was being received, instead of a mark.

What is claimed is:

1. A signal processing system receptive of information representing first and second binary characters and of a form employing predetermined generalized functions comprising first and second correlation means operating on said incoming information each providing a coherent output only when said information is in the form of a first and second binary character respectively, first and second integrating means for integrating the outputs of said first and second correlation means respectively, comparison means for comparing the magnitudes of said integrated outputs during a predetermined portion of each character interval whereby a signal representative of the binary character then available is obtained, a threshold detector responsive to slow variations in output level of said comparison means, a threshold comparator coupled to said threshold detector and responding to rapid fluctuations in said information for producing an inhibit pulse when the output level of said comparison means exceeds a predetermined amplitude, and gating means disposed between each of said correlation means and the corresponding integrating circuit for inhibiting integration by said first and second integrating means for the duration of said inhibit pulse.

2. A signal processing system according to claim 1 wherein the functions representative of said binary characters are pseudo-random functions.

3. A signal processing system according to claim 1 wherein the functions representative of said binary characters are sinusoidal functions.

4. A signal processing system receptive of information representing first and second binary characters and of a form employing predetermined generalized functions comprising first correlation means operating on said incoming information to provide a coherent output when said information is in the form of a first binary character and an incoherent output when said information is in the form of a second binary character, second correlation means operating on said incoming information to provide a coherent output when said information is in the form of said second binary character and an incoherent output when said information is in the form of said first binary character, first and second integrating means for integrating the outputs of said first and second correlation means respectively, comparison means for comparing the magnitudes of the integrated voltages derived from said first and second integrating means during a predetermined portion of each character interval whereby a signal representative of the binary character then available is obtained, first detecting means for detecting rapid fluctuations in level of said information, a threshold detector responsive to slow variations in output level of said comparison means, a threshold comparator receptive of the detected outputs of said first detecting means and said threshold detector for producing an inhibit pulse when the output level of said comparison means exceeds a predetermined amplitude, and gating means disposed between each of said correlation means and the corresponding integrating circuit for inhibiting integration by said first and second integrating means for the duration of said inhibit pulse.

No references cited.

ALFRED L. BRODY, *Primary Examiner.*